US008490338B2

(12) United States Patent
Longo

(10) Patent No.: US 8,490,338 B2
(45) Date of Patent: Jul. 23, 2013

(54) SELF ADHERING WINDOW FLASHING TAPE WITH MULTI-DIRECTIONAL DRAINAGE PLANE

(75) Inventor: William Longo, Mentor, OH (US)

(73) Assignee: Henkel Corporation, Rocky Hill, CT (US)

( * ) Notice: Subject to any disclaimer, the term of this patent is extended or adjusted under 35 U.S.C. 154(b) by 226 days.

(21) Appl. No.: 13/034,123

(22) Filed: Feb. 24, 2011

(65) Prior Publication Data

US 2011/0209424 A1 Sep. 1, 2011

Related U.S. Application Data

(60) Provisional application No. 61/308,360, filed on Feb. 26, 2010.

(51) Int. Cl.
*E04B 1/66* (2006.01)
(52) U.S. Cl.
USPC .................................. 52/58; 156/71
(58) Field of Classification Search
USPC ............... 52/302.6, 58, 62, 408; 428/604, 428/603, 156; 156/71
See application file for complete search history.

(56) References Cited

U.S. PATENT DOCUMENTS

| 1,970,692 | A | * | 8/1934 | Earley | 52/302.6 |
|---|---|---|---|---|---|
| 2,043,987 | A | * | 6/1936 | Brown | 428/132 |
| 2,250,733 | A | * | 7/1941 | Swenson | 52/302.6 |
| 3,124,427 | A | * | 3/1964 | Chomes | 428/603 |
| 6,221,463 | B1 | * | 4/2001 | White | 428/174 |
| 6,280,856 | B1 | * | 8/2001 | Andersen et al. | 428/593 |
| 6,514,597 | B1 | * | 2/2003 | Strobel et al. | 428/167 |
| 7,338,700 | B2 | * | 3/2008 | McKenna et al. | 428/174 |
| 7,585,556 | B2 | * | 9/2009 | Julton | 428/156 |
| 7,900,404 | B2 | * | 3/2011 | Koch et al. | 52/62 |
| 2005/0106360 | A1 | * | 5/2005 | Johnston et al. | 428/167 |
| 2006/0083898 | A1 | * | 4/2006 | Deng et al. | 428/152 |
| 2008/0271400 | A1 | * | 11/2008 | Raidt et al. | 52/408 |
| 2010/0139178 | A1 | * | 6/2010 | Ehrman et al. | 52/58 |
| 2011/0091675 | A1 | * | 4/2011 | Simpson et al. | 428/40.3 |
| 2012/0085063 | A1 | * | 4/2012 | Pufahl | 52/741.4 |

FOREIGN PATENT DOCUMENTS

GB 1243338 * 8/1971

* cited by examiner

*Primary Examiner* — Christine T Cajilig
(74) *Attorney, Agent, or Firm* — James E. Piotrowski

(57) ABSTRACT

The disclosure provides a self adhesive, flexible tape for flashing exterior wall openings. The tape is a composite comprising a barrier layer having an exterior surface and an interior surface and an adhesive layer overlying the interior surface. The barrier layer exterior surface is patterned to provide a gravity drainage path in both the tape machine direction (MD) and tape cross machine direction (CD).

20 Claims, 3 Drawing Sheets

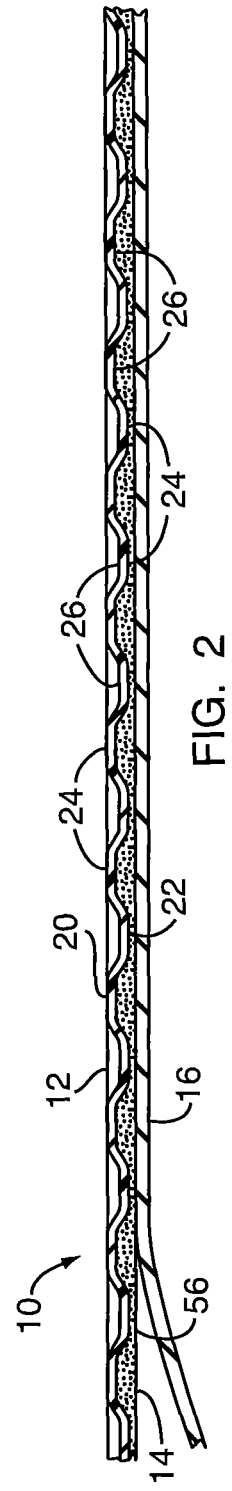
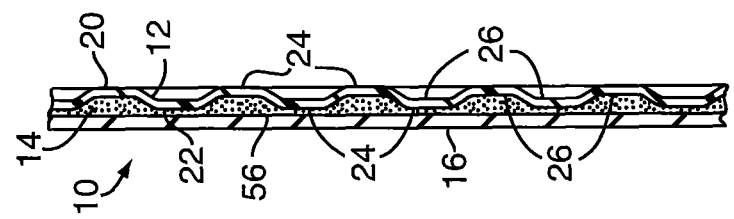

SELF ADHERING WINDOW FLASHING TAPE WITH MULTI-DIRECTIONAL DRAINAGE PLANE

This application claims the benefit of U.S. Provisional Patent Application No. 61/308,360, filed Feb. 26, 2010, the contents of each which are incorporated herein by reference.

FIELD

The present disclosure relates generally to sheet materials useful to help direct water away from openings in a building.

BRIEF DESCRIPTION OF RELATED TECHNOLOGY

Buildings are designed to protect occupants from the environment outside. Thus, the building outer wall structure must prevent entry of rain, snow, wind, etc. into the building. However, buildings will include numerous windows and doors in the outer wall structure. The windows and doors allow light and air into the building and provide a path for people to enter and leave the building. However, each window and door in the outer wall structure presents a potential path for leakage of water into the outer wall structure and building. Leakage of water into the building can create problems such as growth of mold within the wall structure and decay of wood portions of the walls, windows and doors. These problems are concealed by the wall structure and may not be apparent until the damage is extensive. Repair of problems created by water leakage can be difficult and expensive requiring removal of exterior siding, wall sheathing, removal of window or door units, removal of wall and building structure, removal of inside trim, replacement of the removed components and finishing of the replaced components. ASTM E2112-07, the contents of which are incorporated by reference herein, indicates that rainwater leakage in building structures is the leading reason for dissatisfaction of building owners with window installations.

Because leakage problems are difficult to detect and pose problems with repair, numerous materials and procedures have been proposed to help seal an outer wall structure from water penetration. Wall sheathing can be covered with building wrap such as TYVEK available from DuPont or VORTEC available from Valeron Strength Films of Houston Texas. Windows can include water resistant exterior claddings over the wood frames or the frames can be made from impervious materials such as vinyl or fiberglass. Materials known generally as flashing can be fastened or adhered over the junction of door or window frames and outer wall structure to help seal any gap therebetween. Spaces between windows and sheathing can be sealed with caulk. These materials and procedures provide a layered structure that prevents water penetration into the building structure and provides a drainage route away from the wall interior for any water that does penetrate.

U.S. Pat. No. 1,677,130 to G. L. Cherry discloses a rigid flashing for sills. This flashing has corrugations stamped therein to direct water in only one direction parallel to the corrugation.

U.S. Patent Publication No. 2006-0083898 to E.I. DuPont De Nemours and Company discloses a creped material that can allegedly be used as an opening flashing. Creping compresses the material in the MD, forming ridges and valleys in the CD. These ridges and valleys allow the material to be elongated at least about 150% and preferably about 150% to about 570%. This elongation allows the material to stretch around the radius of a corner.

Valeron Strength Films sells VORTEC, an embossed sheet material that is wrapped over the exterior wall sheathing and under the wall siding and stapled in place (building wrap). The VORTEC sheet is not adhesive and is not used as a flashing material. Valeron literature recommends that conventional flashing products be used to seal the area between the window and VORTEC wrap.

Despite all of these flashing materials and procedures it is still possible for water to enter into the building structure undetected. New and improved flashing materials to help prevent penetration of water into a wall structure and provide a drainage route away from the wall interior for any water that does penetrate are needed.

Definitions

AAMA—American Architectural Manufacturers Association.

ASTM—ASTM International, originally known as the American Society for Testing and Materials.

Cross direction (CD)—The direction perpendicular to the machine direction. The CD is typically the short axis or width of a material.

Film—A thin, continuous, non-porous, non-fibrous sheet of a substance.

Head—The top edge of the window opening.

Jamb—The vertical side of a window opening.

Machine direction (MD)—The direction of travel of the forming surface onto which material is deposited during formation of a sheet material. The MD is typically the long axis or length of a material.

Nonwoven fabric, sheet or web—A material having a structure of individual fibers which are interlaid, but not in an identifiable manner as in a woven or knitted fabric. Nonwoven materials have been formed from many processes such as, for example, meltblowing, spunbonding, carding and water laying processes. The basis weight of nonwoven fabrics is usually expressed in grams per square meter (gsm) and the fiber fineness is measured in denier.

Sill—The lower horizontal surface of a window opening.

Substantially continuous—In reference to the polymeric filaments of a nonwoven web, it is meant that a majority of the filaments or fibers formed by extrusion through orifices remain as continuous nonbroken filaments as they are drawn and then impacted on the collection device. Some filaments may be broken during the attenuation or drawing process, with a substantial majority of the filaments remaining continuous.

SUMMARY

One aspect of the disclosure provides a flexible tape for flashing exterior surfaces such as roofs, roof edges and wall openings. The tape comprises a barrier layer having an exterior surface and an interior surface. The barrier layer exterior surface provides a plurality of gravity drainage paths in both the machine direction (MD) and cross machine direction (CD). A gravity drainage path is the downward path that water will take under the influence of gravity. If the tape is positioned with the MD horizontal there are a plurality of gravity drainage paths in the CD. If the same tape is positioned with the MD vertical there are a plurality of gravity drainage paths in the MD. If the tape is positioned with the MD between horizontal and vertical there will typically be some downwardly oriented paths through which water can gravity drain. Since the tape exterior surface provides a gravity drainage path in both the machine direction (MD) and cross machine direction (CD) it is multidirectional. Advantageously, the tape is a self adhesive composite comprising a barrier layer having an exterior surface with a multidirectional gravity drainage path and an interior surface, an adhesive layer overlying the interior surface and optionally a release paper releasably bonded to the adhesive layer.

The tape is applied over the junction between a door or window frame and sheathing edges at the building rough wall opening to lessen penetration of air and water into any gap in the wall structure. The sheathing, tape and window frame is subsequently covered by a final, exterior siding such as wood, vinyl, aluminum or fiber-cement.

In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

BRIEF DESCRIPTION OF THE DRAWINGS

Referring now to the drawings wherein like elements are numbered alike in the several Figures:

FIG. 2 is a cross sectional view of a portion of the flashing tape of FIG. 1.

FIG. 3 is a cross sectional view of a portion of the flashing tape of FIG. 1.

DETAILED DESCRIPTION

One aspect of the disclosure provides a tape 10 for flashing. Typically the tape is 2 to 12 inches in width (CD) and has a length (MD) convenient for use, for example about 20 to 100 feet. The tape thickness (Z direction) is not critical and can be varied within a wide range depending on the materials chosen and desired flexibility in the Z direction. The tape is substantially impermeable to water and air.

The tape advantageously has a tensile strength of about 140 psi or more when tested under ASTM D412, method A. The tape is advantageously sufficiently flexible in the Z direction at temperatures encountered during construction of buildings, such as about 0° F. to 125° F., to allow winding and unwinding from a roll form and application to a building structure. However, the tape has substantially no elongation or stretch at these temperatures and under forces that can be applied by a user pulling on the tape with their hands. Thus, the tape can not practically be stretched or elongated in the MD or CD or around a corner.

In one embodiment the tape comprises a barrier layer 12. This tape can be mechanically fastened to a building structure. In another embodiment the tape is a composite comprising a barrier layer 12, an adhesive layer 14 and optionally other layers or threads intermediate the barrier layer and the adhesive layer. With reference to FIGS. 2 and 3, in another embodiment the tape is a composite comprising a barrier layer 12 and an adhesive layer 14 bonded thereto. The tape may optionally include a release paper 16 or may be self releasing. In some advantageous embodiments the tape consists essentially of the barrier layer 12, the adhesive layer 14 bonded to one surface of the barrier layer and optionally a release paper 16 or self releasing layer. This advantageous embodiment excludes additional layers such as woven or nonwoven scrims within the tape.

Figure 1:
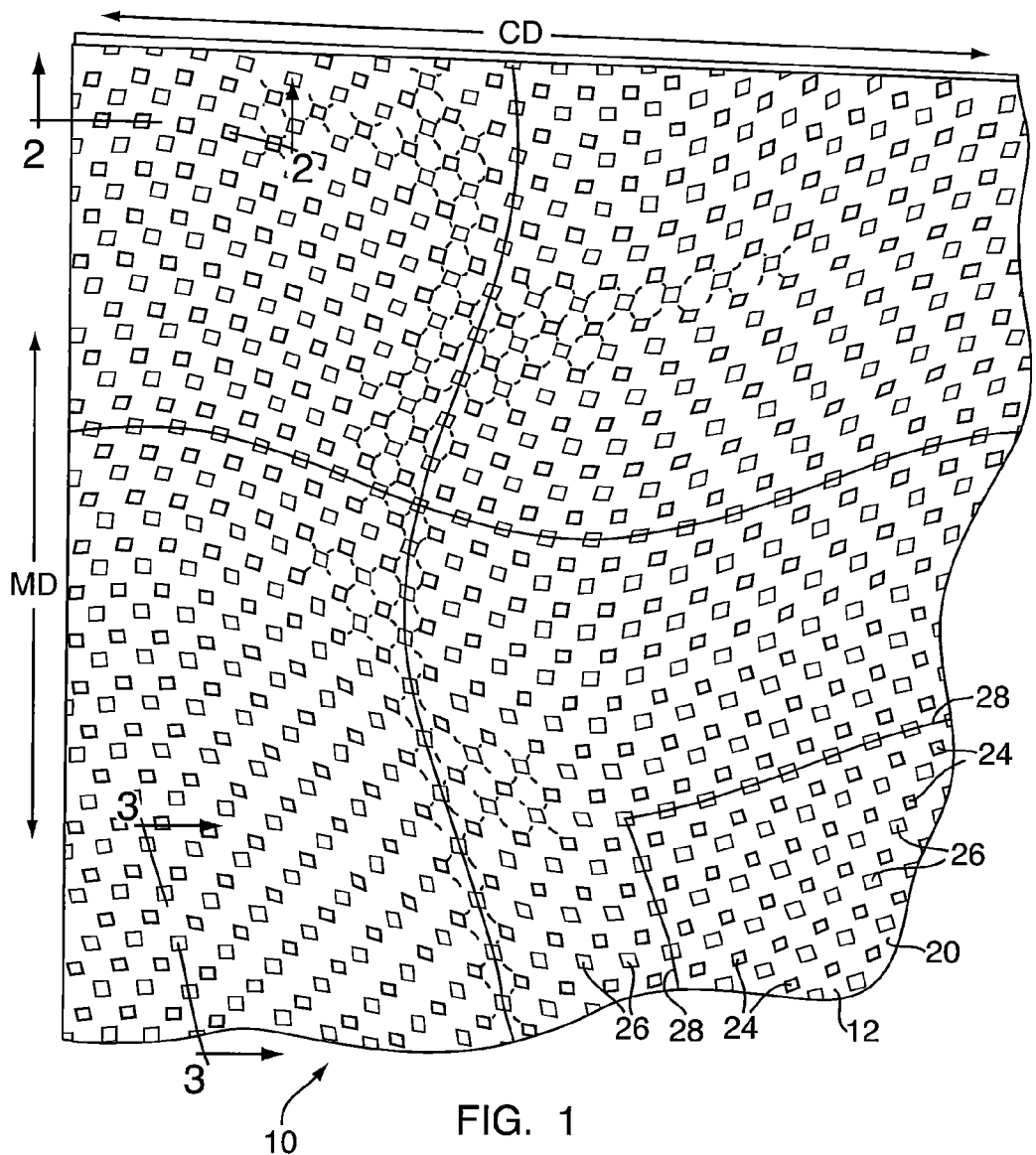
FIG. 1 is a top plan view of a flat portion of the flashing tape exterior surface.
Figure 4:
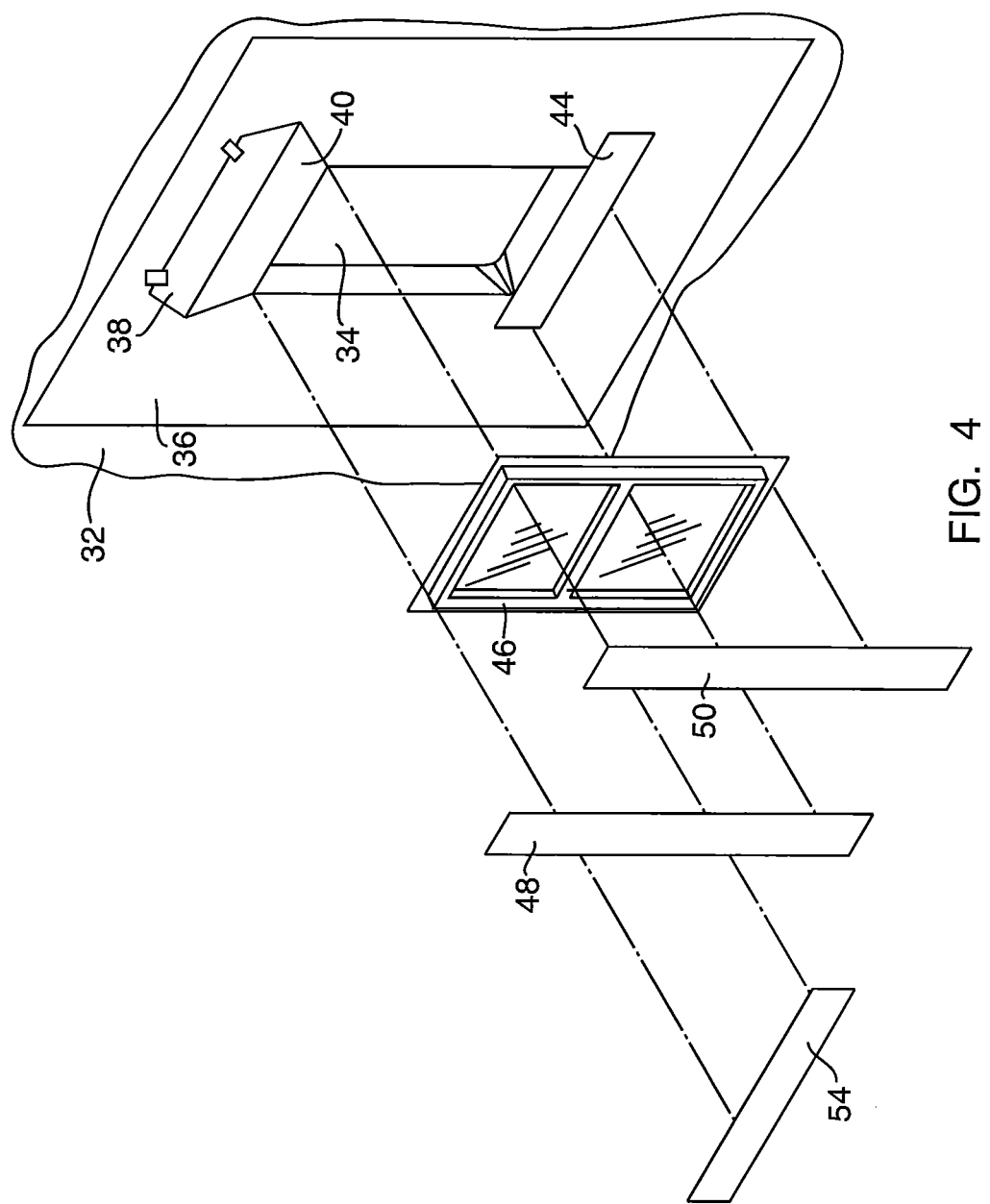
FIG. 4 is an exploded, schematic, perspective view of a portion of a building exterior wall comprising a window frame and flashing tape sections.

The barrier layer has an exterior surface 20 and an interior surface 22. With reference to FIGS. 1 and 2 the barrier layer exterior surface is three dimensionally patterned although the tape has a generally planar, sheet like appearance. The three dimensional patterning provides each part of the exterior surface 20 with a non-planar surface defining a plurality of gravity drainage paths to allow water to flow under the influence of gravity in either the machine direction (MD) or the cross machine direction (CD) depending on tape orientation. In one variation the pattern comprises a plurality of arrayed peaks 24 and an adjacent plurality of arrayed depressions 26. The height of the peak over the barrier layer surface and the depth of the depression under the barrier layer surface is not critical and can be independently adjusted for intended use. In one embodiment advantageous for use as a window or door flashing the peak and depression height can be about, for example, about 0.001 to about 0.020 inches above and below the barrier surface. In this embodiment the total tape thickness, maximum peak height to maximum depression depth (Z), can be about 0.002 to about 0.040. Tape useful for roof flashing can have a substantially greater peak height than tape useful for window or door flashing. The slope between a peak base and peak top can be varied from very steep or almost vertical to shallow. The shape of the peak is not critical. In one advantageous embodiment the peaks are rectangular or diamond shaped. The peaks 24 and depressions 26 are arranged so that each adjacent array of peaks defines a channel 28 therebetween. The channels extend in both the MD and in the CD. Advantageously, the sheet exterior surface and interior surface are mirror images, that is, the peak on one surface is the depression on the opposing surface. In this variation both surfaces will have channels extending in the MD and in the CD and gravity drainage path in both the MD and the CD. This variation simplifies use as either surface can be used as the exterior surface.

The barrier layer 12 advantageously provides and water impermeability for the tape. Barrier layer material thickness is not critical and can be varied within a wide range depending on the materials chosen and desired flexibility, for example about 0.001 to about 0.070 inches or more. In one embodiment advantageous for window and door flashing use the barrier layer material thickness is about 0.003 to about 0.020 inches. As used herein the barrier layer material thickness refers to thickness of that layer without consideration of any peaks or depressions. The barrier layer can be comprised of any polymer film, metal film, nonwoven fibrous polymer sheet or combination that provides the ability to take and maintain a pattern on one surface and that is substantially impermeable to water. Some useful materials for the barrier layer 12 include aluminum or other metal film; a nonwoven sheet comprised of substantially continuous fibers, such as polyethylene, polypropylene, polyester, nylon and combinations thereof; a non-fibrous polymeric film, for example polyethylene, polypropylene, ethylene vinyl acetate, rubber, nylon, polyester, polyvinyl chloride or a combination thereof. The barrier layer can be impregnated or coated to lessen permeability. In one advantageous embodiment the barrier layer is a non porous, non fibrous polyolefin film.

In one embodiment the tape does not include adhesive and is mechanically fastened to a surface. This embodiment is less advantageous as it is more difficult to apply to the surface. In a more advantageous embodiment the adhesive layer 14 is bonded to the barrier layer interior surface 22. The adhesive should remain bonded to the barrier layer 12 during use. The adhesive layer 14 can follow the topography of the non-planar interior surface 22 pattern. In other variations the adhesive layer 14 thickness will fill in the pattern so that the adhesive surface 56 is generally flat.

The adhesive layer 14 comprises one or more adhesives that are advantageously pressure sensitive adhesives (PSA) and flexible over a range of temperatures from about 0° F. to about 176° F., for example over the range of temperatures encountered during construction of buildings such as about 0° F. to about 125° F. Desirably, the adhesive provides the tape with a 90° peel adhesion to building substrates of about 0.26 N/mm (1.5 pounds/inch) or more when tested using ASTM D3330, Method F. It is also desirable for the adhesive to allow the tape to maintain this adhesion level after elevated temperature exposure (AAMA 711-07, section 5.5); after thermal cycling (AAMA 711-07, section 5.6); and after water immersion (AAMA 711-07, section 5.8). In some advantageous embodiments the adhesive material provides a permanent, non-relocatable bond to the building structure under construction applications can be used. The contents of AAMA 711-07 are incorporated by reference herein. Some non-relocatable adhesives may allow some part of the applied tape to be peeled off and reapplied without destruction of the tape. However the non-relocatable adhesive will bond to the surface permanently without requiring mechanical fastening. Use of relocatable adhesives that allow undamaged removal of an adhered tape and rebonding are less desirable as they will require mechanical fastening to the structure thereby complicating installation of the tape.

Some suitable adhesives include acrylic adhesives, butyl rubber based adhesives, and rubberized asphalt adhesives. Other useful adhesives may include vinyl ether, styrene-isoprene-styrene (SIS), styrene-butadiene-styrene (SBS), styrene-ethylene-butylene-styrene (SEBS), ethylene-propylene-diene monomer, and combinations thereof. Advantageously butyl rubber based PSA adhesives are used.

In some embodiments the release paper 16 is removable bonded to the adhesion surface 56. Suitable release papers typically include a nonwoven or paper or film backing coated on one side with an only slightly bondable material such as silicone or polyolefin. The coated side of the release paper is applied to the adhesive to prevent the adhesive from prematurely bonding to an unintended surface. If the tape is in roll form the release paper 16 prevents the adhesive 14 from bonding to the exterior surface 20 of the underlying layer. During use the adhesive can be readily separated from the release paper so that the tape is ready for application and bonding to a building surface.

The release paper can be split or perforated to allow selective, partial removal of one portion of the release paper while the other portion remains attached to the adhesive layer. Typically the release paper will be split along the machine direction. With reference to U.S. Pat. No. 6,235,365, the contents of which are incorporated by reference, a string, or a plurality of strings, can be positioned between the barrier layer 12 and the release paper 16, typically between the adhesive layer 14 and release paper 16. The string is operative, when pulled away from the adhesive layer 14, to cut the release paper 16 into smaller portions for selective partial removal if and when desired. The string is preferably oriented along the length of the tape 10 in the machine direction. Where a number of strings are employed, they can be spaced at intervals across the width of the tape so that variously-sized portions of the release paper may be cut by pulling on the appropriate string.

In some embodiments the barrier layer exterior surface 20 may be coated with an only slightly bondable material such as a silicone. When the tape is formed into a roll the silicone coating prevents the adhesive of an overlying layer from permanently bonding to the exterior surface of the adjacent underlying layer. This variation does not require use of a release paper to form a roll and during use the tape can advantageously be unrolled and applied without having to remove and dispose of a release paper.

To form the tape 10 a film or sheet of material is provided. The sheet can be passed between heated, rotating rolls. Each roll comprises a pattern of peaks and depressions etched into the surface. As the sheet passes between the heated, rotating rolls the sheet is plastically deformed and patterned to provide a corresponding plurality of arrayed peaks and a plurality of arrayed depressions and channels between adjacent peaks extending in the MD and in the CD. The channels provide the gravity drainage path in the MD and the CD depending on tape orientation.

Coatings can be impregnated into or coated onto a barrier sheet before or after calendaring depending on the material. Coatings can be useful, for example, to lessen water penetration through some types of sheet material, change physical characteristics such as sheet stiffness of some types of sheet material or as a self release coating.

Adhesive is applied to the non-patterned interior surface 22 of the barrier layer 12 to form the adhesive layer 14. If both surfaces of the barrier layer are patterned the adhesive can be applied to either surface. The method used to apply adhesive to the barrier layer will vary depending on the type of adhesive that is chosen. Typically adhesives can be applied by spraying, rolling, brushing or coating the adhesive on one surface of the sheet or by lamination of a preformed film of adhesive to one surface of the sheet. Adhesive can be applied over the entire interior surface 22 or in an interrupted fashion, for example discrete, separated portions of adhesive over some smaller portion of the interior surface 22 to provide a desired bond strength to the building structure.

Release paper 16, if used, can be laminated to the adhesive layer. The finished tape can be wound around a core and into roll form and cut into desired widths using methods and equipment known in the art.

Also disclosed is a method of using the tape to flash an opening in an unfinished building wall. The method includes:

Preparing rough opening 34 in the building wrap 36 attached to the building wall 32. This can be done by cutting back the building wrap over the opening. Create an upper flap 38 of building wrap exposing the wall sheathing to allow clearance for head flashing. Temporarily secure flap 38 up, exposing sheathing 40.

Cutting the tape 16 using the following formulas:

Still Flashing length=rough opening width+(2× flashing width)

Jamb Flashing length=rough opening height+(2× flashing width)−1"

Head Flashing length=rough opening width+(2× flashing width)+2"

Applying tape 16 on the sheathing 40 or building wrap 36 at sill level with the top edge of the rough opening frame to form a sill flashing 44. Each end of the tape should extend approximately 9" beyond the rough opening at the jamb. Window flashing or sill pans may be installed in the opening and the tape can overlap the flashing or sill pan.

Setting the window 46 into the opening 34 and install in accordance with window manufacturer's instructions. Typically the window frame fits within the opening and flanges extend from the window frame and over the wall sheathing. The window flanges are secured to the wall.

Appling tape on one jamb 48 or 50 starting on the side of the window flange and continuing away from window and over the opening onto the building wrap 36. The tape should extend approximately 8.5" beyond the head and sill of the rough opening. Press the tape adhesive to adhere the tape to the window flange and building wrap. Repeat for the other jamb 48 or 50.

Appling tape head flashing 54 starting on the top flange on the window and continuing over the opening onto the sheathing. The tape should extend beyond the jamb flashing by about 1" on each side.

Pulling down upper flap 38 so it lays flat over tape used for head flashing 54. Seal along all cuts in weather barrier and across head with weather barrier tape.

Typically, exterior siding will be secured over the sheathing, building wrap and flashing.

After installation on a building structure the disclosed flashing tape provides vertical channels at both the sill and the jambs. These channels are in the MD on the jamb flashings 48, 50 and in the CD on the sill flashing 44 and head flashing 54. These channels provide a downward (with reference to gravity) drainage path for any water penetrating the exterior siding, away from the window opening. Creped products can provide only a horizontal channel at the jambs that directs water into the window opening.

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

What is claimed:

1. A generally planar flashing tape having a length and a width, comprising:
    a water impermeable, substantially non-elongatable barrier layer comprising a sheet material having a length, a width and a thickness, the barrier layer having an exterior surface and an opposing interior surface that are each defined by the length and width of the sheet material, the exterior surface three dimensionally patterned to provide a plurality of gravity drainage paths in both a machine direction (MD) and a cross direction (CD);
    a permanent, non-relocatable, pressure sensitive adhesive bonded to a portion of the interior surface, wherein the pressure sensitive adhesive can be used to bond the flashing tape to a building.

2. The flashing tape of claim 1 wherein the exterior surface three dimensional pattern comprises a plurality of arrayed channels in the MD and a plurality of arrayed channels in the CD.

3. The flashing tape of claim 1 wherein the exterior surface three dimensional pattern comprises a plurality of arrayed, sinusoidal channels in the MD and a plurality of arrayed sinusoidal channels in the CD.

4. The flashing tape of claim 1, further comprising the release paper removably bonded to the adhesive layer.

5. The flashing tape of claim 1 wherein the adhesive is bonded to substantially all of the interior surface.

6. The flashing tape of claim 1 wherein the interior surface is three dimensionally patterned in a mirror image of the exterior surface.

7. The flashing tape of claim 1 wherein the adhesive layer comprises at least one of an acrylic adhesive, a butyl rubber adhesive or a rubberized asphalt adhesive.

8. The flashing tape of claim 1 wherein the sheet material comprises a polymer.

9. The flashing tape of claim 1 wherein the sheet material is a polymer film.

10. The flashing tape of claim 1 wherein the sheet material is a non-porous, non-fibrous, polyolefin film.

11. The flashing tape of claim 1 wherein the sheet material is a non-porous, non-fibrous, polyethylene film.

12. The flashing tape of claim 1 wherein the barrier layer comprises a metal foil.

13. The flashing tape of claim 1 consisting essentially of the barrier layer, the adhesive layer and a release paper.

14. The flashing tape of claim 1 in roll form, comprising a core and the length of flashing tape wound around a core in a plurality of overlapping convolutions.

15. A building comprising:
    an outer wall structure including an exterior surface, the outer wall structure defining an opening therethrough;
    a window disposed within the opening and secured to the outer wall structure; and
    a flashing tape portion having a length and a width and comprising a water impermeable, substantially: non-elongatable barrier layer comprising a sheet material having a length, a width and a thickness, the barrier layer having an exterior surface and an opposing interior surface that are each defined by the length and width of the sheet material, the exterior surface having a plurality of projections to provide a plurality of gravity drainage paths in both the MD and CD and a pressure sensitive adhesive bonded to a portion of the interior surface, the pressure sensitive adhesive permanently bonding the tape between the window and outer wall exterior surface and the tape exterior surface providing the outer wall structure with a plurality of gravity drainage paths.

16. The building of claim 15, further comprising exterior sheathing overlying the flashing tape.

17. The building of claim 15, wherein the building exterior surface is selected from sheathing or building wrap.

18. The building of claim 15, comprising a plurality of flashing tape portions each having their MD generally perpendicular to another, wherein each flashing tape portion provides the outer wall structure with a plurality of gravity drainage paths.

19. The building of claim 15, comprising a first flashing tape portion selected from a length of flashing tape, the first tape portion permanently bonded adjacent the window sill forming a sill flashing and a second flashing tape portion selected from the same length of flashing tape, the second tape portion permanently bonded adjacent the window jamb forming a jamb flashing, the second tape portion overlying the first flashing tape portion and substantially perpendicular thereto, wherein each flashing tape portion provides the outer wall structure with a plurality of gravity drainage paths.

20. The building of claim 15 wherein the flashing tape portion is substantially straight in the MD.

\* \* \* \* \*